(12) United States Patent
Frye et al.

(10) Patent No.: US 11,060,657 B1
(45) Date of Patent: Jul. 13, 2021

(54) TELESCOPING SUPPORT STAND FOR A USER-OPERATED DEVICE

(71) Applicant: Recor Outdoors, LLC, Oberlin, OH (US)

(72) Inventors: Steven Frye, Elyria, OH (US); Kurt Lauer, Elyria, OH (US)

(73) Assignee: Recor Outdoors, LLC, Elyria, OH (US)

( * ) Notice: Subject to any disclaimer, the term of this patent is extended or adjusted under 35 U.S.C. 154(b) by 0 days.

(21) Appl. No.: 16/790,944

(22) Filed: Feb. 14, 2020

(51) Int. Cl.
| | | |
|---|---|---|
| *F41B 5/14* | (2006.01) | |
| *F16M 11/00* | (2006.01) | |
| *F41B 5/10* | (2006.01) | |
| *F16M 11/28* | (2006.01) | |
| *F41A 23/06* | (2006.01) | |

(52) U.S. Cl.
CPC ......... *F16M 11/28* (2013.01); *F16M 2200/02* (2013.01); *F16M 2200/08* (2013.01); *F41A 23/06* (2013.01); *F41B 5/10* (2013.01); *F41B 5/1426* (2013.01); *F41B 5/1453* (2013.01)

(58) Field of Classification Search
CPC ............... F16M 11/28; F16M 2200/02; F16M 2200/08; F41A 23/06; F41B 5/1426; F41B 5/10; F41B 5/1453
See application file for complete search history.

(56) References Cited

U.S. PATENT DOCUMENTS

| | | | |
|---|---|---|---|
| 6,176,398 B1 | 1/2001 | Chang | |
| 7,434,773 B1 * | 10/2008 | Minjares | F41A 23/06 124/86 |
| 7,959,039 B2 * | 6/2011 | Beckett | B05C 17/0123 222/391 |
| 8,328,147 B2 | 12/2012 | Gardner | |
| 8,833,350 B1 * | 9/2014 | Specht | F41B 5/1469 124/35.2 |
| 8,882,070 B2 * | 11/2014 | Bean | F41B 5/14 248/316.1 |
| 9,010,710 B1 | 4/2015 | Young | |
| 2010/0258701 A1 * | 10/2010 | Foreman | B62K 19/36 248/408 |
| 2012/0304974 A1 * | 12/2012 | Goff | F41B 5/123 124/25 |

(Continued)

OTHER PUBLICATIONS

Wikihow Staff, "How to Use a Caulking Gun", https://www.wikihow.com/Use-a-Caulking-Gun, Mar. 29, 2019, wikiHow, USA.

(Continued)

*Primary Examiner* — Tan Le

(74) *Attorney, Agent, or Firm* — Michael J. Folise; Nathaniel Trujillo; Ben Krumpelman

(57) ABSTRACT

The present disclosure relates to adjustable stands for supporting a user operated device, such as a compound bow, arrangements for attaching the user operated device to the stand, and/or arrangements for mounting one or more additional accessories to the stand. The stand includes telescoping, height-adjustable leg assemblies and user operable locking arrangements to lock the height of the stand. The arrangements for attaching the user operated device are adjustable to accommodate differently sized user operated devices and provide clearance between the user-operated device and the stand for users of various hand sizes.

15 Claims, 9 Drawing Sheets

(56) References Cited

U.S. PATENT DOCUMENTS

2013/0233292 A1* 9/2013 Gardner ............... F41A 23/10
124/25.6

OTHER PUBLICATIONS

Hunter Club1, "1Pc Archery Recurve Bow Stand Holder Fiberglass Shaft Support Black HC", https://www.ebay.com/i/31243127862?chn=ps, Ebay, USA.
Adorama, "Manfrotto 685B Neotec Monopod—Black", https://www.adorama.com/bg685b.html?gclid=EAlalQobChMlnuXG_o3Q4AIVzrXACh3NdQBHEAQYBSABEgKZp_D_BwE, Adorama, USA.
Sheldon Brown, "Shimano Nexus/Alfine 3, 4, 7, 8, 11 Speed Hub Technical Information", https:www.sheldonbrown.com/nexus-mech.html, Mar. 5, 2020, Harris Cyclery, USA.

* cited by examiner

TELESCOPING SUPPORT STAND FOR A USER-OPERATED DEVICE

TECHNICAL FIELD

The present disclosure relates generally to mounting and supporting arrangements for user operated devices, including support stands and accessories.

BACKGROUND

Users of hand operated devices (e.g., cameras, firearms, often desire additional support or stabilization to achieve superior results. For example, archers desire support and stabilization of their bow to facilitate steady aiming and increased accuracy when shooting. A stand attached to or otherwise supporting a bow or other user operated device may provide such support and stabilization.

SUMMARY

The present disclosure relates generally to adjustable stands for supporting a user operated device, arrangements for attaching the user operated device to the stand, and/or arrangements for mounting one or more additional accessories to the stand. A support stand, as contemplated in the present disclosure, could be used to support devices such as a camera, firearm, or compound bow, or used alone for stability as a walking staff or a tent-pole.

In accordance with an exemplary embodiment of the instant disclosure, a telescoping support stand includes a foot assembly for engaging a ground surface; a telescoping leg including an inner frame member having a lower end attached to the foot assembly, and an outer frame member including a first passage telescopically receiving an upper end of the inner frame member; and a leg locking arrangement including a lower housing secured to the lower end of the outer frame member and defining a passage for receiving the upper end of the inner frame member. A locking plate is disposed in the lower housing, the locking plate is movable between a locking position in which an edge of the locking plate is biased to engage the inner frame member to secure the inner frame member with respect to the outer frame member, and a releasing position in which the locking plate is substantially perpendicular to the inner frame member and disengages from the inner frame member to permit telescoping movement of the inner frame member with respect to the outer frame member. A biasing member is disposed in the lower housing as well and is configured to bias the locking plate toward the locking position. The support stand further has a lock releasing arrangement including: an upper housing secured to the upper end of the outer frame member; an actuating rod extending through a second passage in the outer frame member and including a first end received in the upper housing and a second end received in the lower housing engageable with the locking plate, and being able to move the locking plate from the locking position to the releasing position; and a user operable actuator assembled within upper housing and operable to move the actuating rod.

In accordance with an exemplary embodiment of the instant disclosure, a telescoping support stand additionally may include a mounting arrangement. The mounting arrangement including a mounting bracket to couple the telescoping support stand to various-sized operable devices. The bracket being capable of lateral adjustment with regard to the user-operated device. The mounting arrangement additionally including a securing mechanism to attach the mounting bracket to one face of the upper housing. In one example the securing mechanism includes screws. Adhesive or bolts could also be used as the securing mechanism. The mounting arrangement is also capable of forward and aft movement with regard to the upper housing to accommodate a user's hand size, providing adequate clearance for a user's hand between the securing mechanism and the user operated device.

BRIEF DESCRIPTION OF THE DRAWINGS

Embodiments of the instant disclosure will now be described in further detail with reference to the accompanying drawings, in which.

DETAILED DESCRIPTION

The detailed description herein shows various exemplary embodiments of the instant disclosure. These exemplary embodiments are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent embodiments that are known to those of reasonable skill in the art. Additionally, all included figures are non-limiting illustrations of the exemplary embodiments, which similarly avail themselves to any equivalent embodiments that would be understood to those of ordinary skill in the art.

The illustrated embodiment is shown and described in use with a compound bow. In other embodiments, a support stand including one or more of the inventive features described herein could be used with other user-operated devices like a firearm or camera, or used by itself as a tent-pole or walking stick.

Figure 1:
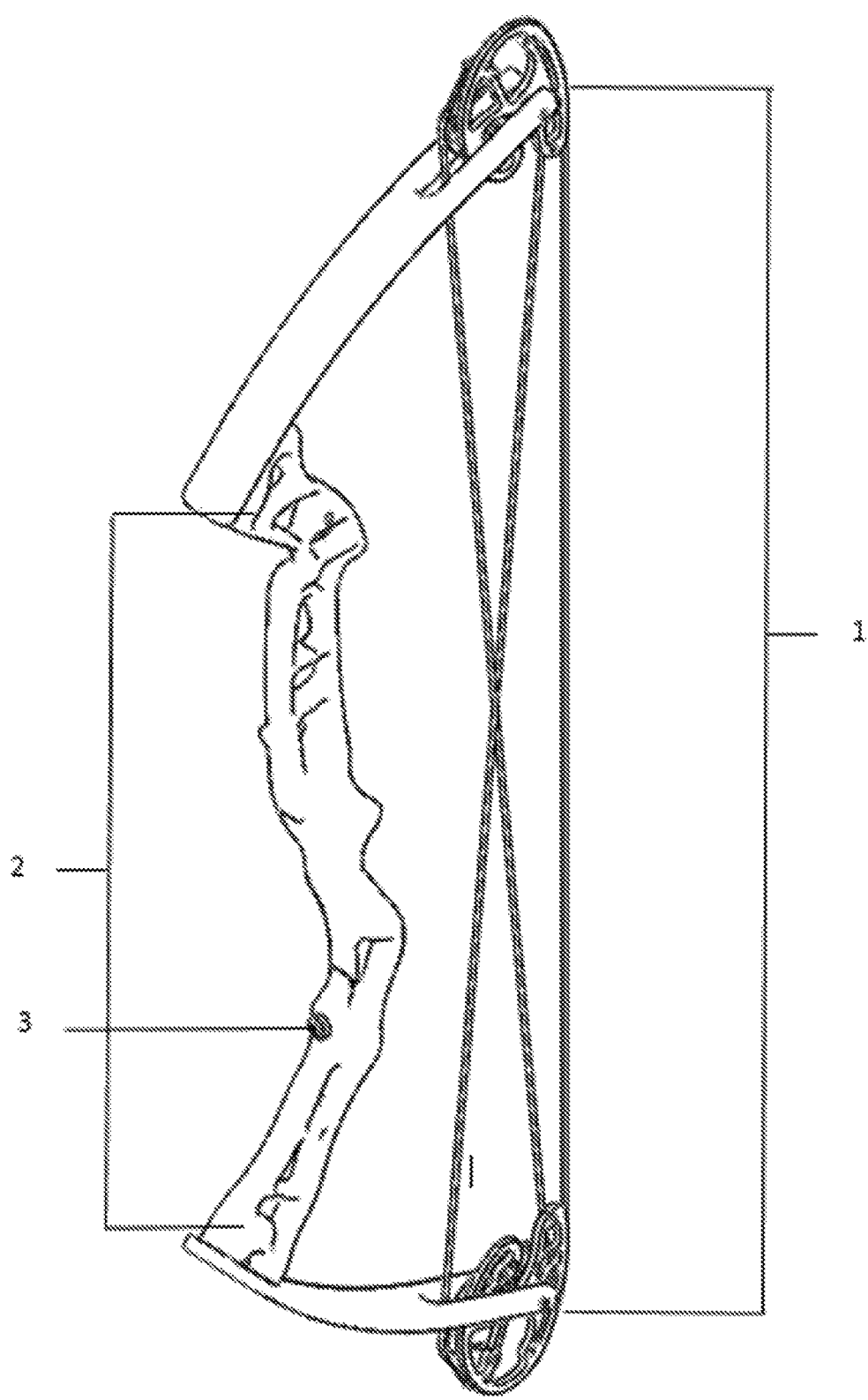
FIG. 1 illustrates a user operable compound bow that can be coupled to a support stand in accordance with the embodiments of the instant disclosure.

FIG. 1 shows a compound bow 1 that is configured to couple to a support stand. The compound bow 1 includes a riser 2, which has a stabilizer mount 3 on it. The riser 2 usually includes a front side, a rear side and a hand grip for a user to hold the compound bow. In one example, the stabilizer mount 3 is located on the front of the riser 2. The width of riser (the distance between two sides) can be variable.

Figure 2:
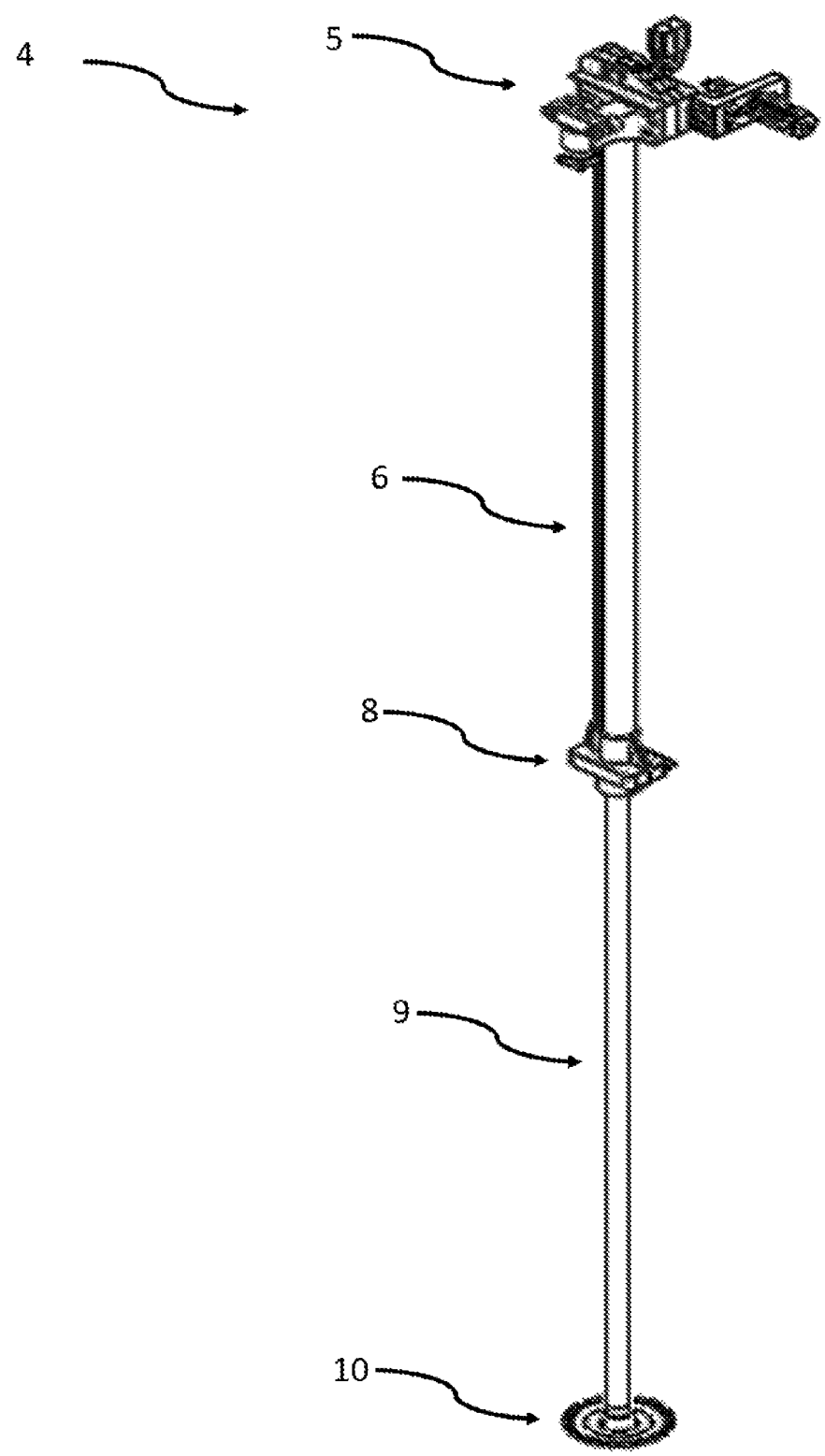
FIG. 2 illustrates an exemplary support stand in accordance with the exemplary embodiment of the instant disclosure, with the support stand shown in a fully extended state.

FIG. 2 illustrates an exemplary support stand 4 in a fully extended state. The support stand includes an upper assembly 5, a telescoping leg 6, a lower assembly 8, an inner frame member 9 having one upper end received in the passage of the outer frame member, and a lower end connected to the foot assembly 10.

Figure 3A:
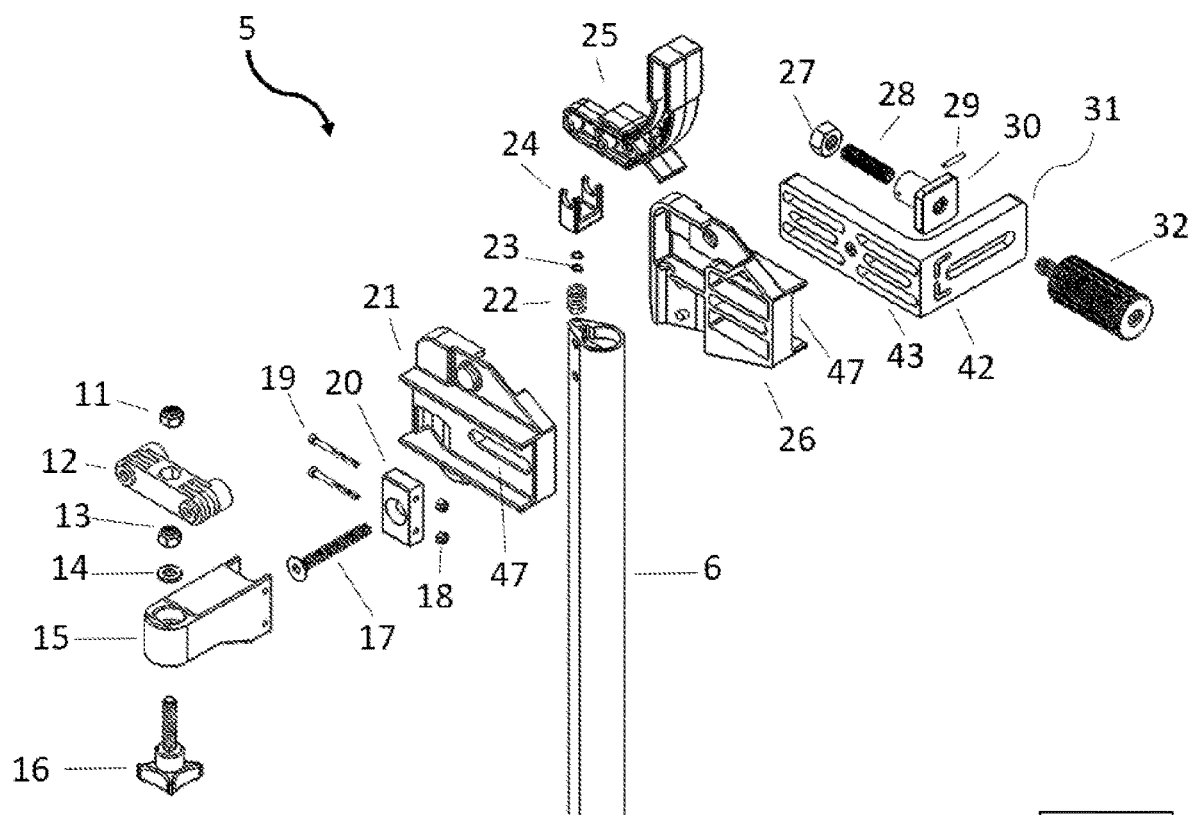
FIG. 3a illustrates an exploded perspective view of the upper assembly and mounting configuration of the exemplary support stand of FIG. 2.

FIG. 3a illustrates an exploded perspective view of the upper assembly 5 of FIG. 2. The upper assembly 5 includes three additional sub-assemblies: the mounting sub-assembly, the upper housing sub-assembly and the accessory sub-assembly.

The mounting sub-assembly may be adapted to connect the support stand 4 of FIG. 2 to the compound bow 1 of FIG. 1. As shown in FIG. 3a, the exemplary mounting sub-assembly includes a jam nut 27, a set screw 28, a pin 29, an anti-rotation lock 30, a L-shaped adjustment bracket 31 and a stabilizer bolt 32. The set screw 28 with the jam nut 27, secured with the pin 29 through the anti-rotation lock 30, is configured to thread into the stabilizer mount 3 on the riser 2 of a compound bow 1 (e.g., the bow 1 of FIG. 1). The exemplary L-shaped adjustment bracket 31 has a linear hole in the center of the front arm 42, allowing the threaded portion of the stabilizer bolt 32 to go through the front arm 42 and thread into the anti-rotation lock 30, therefore securing a compound bow to the support stand 4.

Also shown in FIG. 3a, the upper assembly 5 further includes a housing sub-assembly. The housing sub-assembly includes an upper housing-left 26 and an upper housing-right 21. These two pieces of housing are configured to cover the upper end of the outer frame member of the leg assembly. The two pieces of housing can be assembled using retention clips, a set of screws, or any other securing fastener(s). Each piece of the upper housing, 21 and 26, includes a horizontal recessed pocket 47 on its outer side, configured to accept the side arm 43 of the adjustment bracket 31.

Figure 3B:
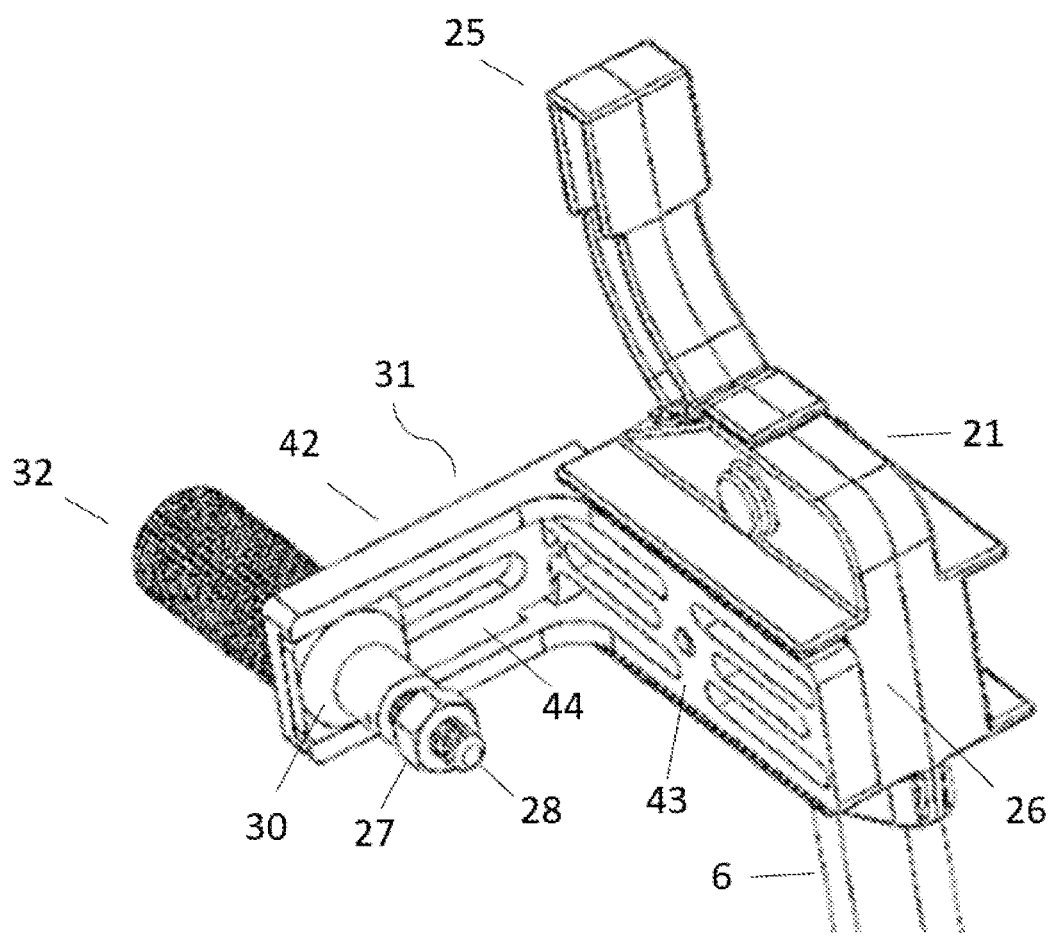
FIG. 3b illustrates a perspective view of the upper assembly of the support stand of FIG. 2.

FIG. 3b illustrates a perspective view of the complete mounting assembly of FIG. 3a demonstrating the anti-rotation lock 30. The front arm 42 of the L-shaped bracket contains a linear pocket 44, allowing the anti-rotation lock 30 to slide within the pocket horizontally to accommodate risers 2 having various widths. The anti-rotation lock 30 prevents the stand from changing orientation with regard to the bow 1. The side arm 43 of the L-shaped adjustment bracket 31 is configured to accept a screw threading through the side arm 43 to secure the adjustment bracket 31 to the upper housing-left 26. This allows the adjustment bracket 31 to slide horizontally in a forward or aft direction. Once the adjustment bracket 31 is so adjusted that it provides clearance for a user's hand size between the securing mechanism and the user operated device, it can be secured to the outer side of the upper housing by a fastener. The fastener can be, but not limited to, a screw, bolt, or hook and look fastener. In the illustrated embodiment, the upper-housing-left 26 and the upper housing-right 21 are mirror-symmetrical, allowing the mounting sub-assembly to be secured to either side of the upper housing, accommodating either left-handed or right-handed users.

The upper assembly further includes an accessory sub-assembly. The accessory sub-assembly is configured to mount optional accessories, including but not limited to, cameras, lasers and lights to the support stand. Using a camera accessory as an example, the camera mount 15 may be attached to the accessory mount 20 by using two bolts 19 and two nuts 18. A thumb screw 16, a washer 14, and a nut 13 together by passing through the camera mount 15, provide a method of mounting accessories such as a GoPro™ mount with a specific GoPro™ nut 11. In one example, the accessory mount 20 is configured to secure to either side of the upper housing due to the symmetrical design of the upper housing.

Figure 3C:
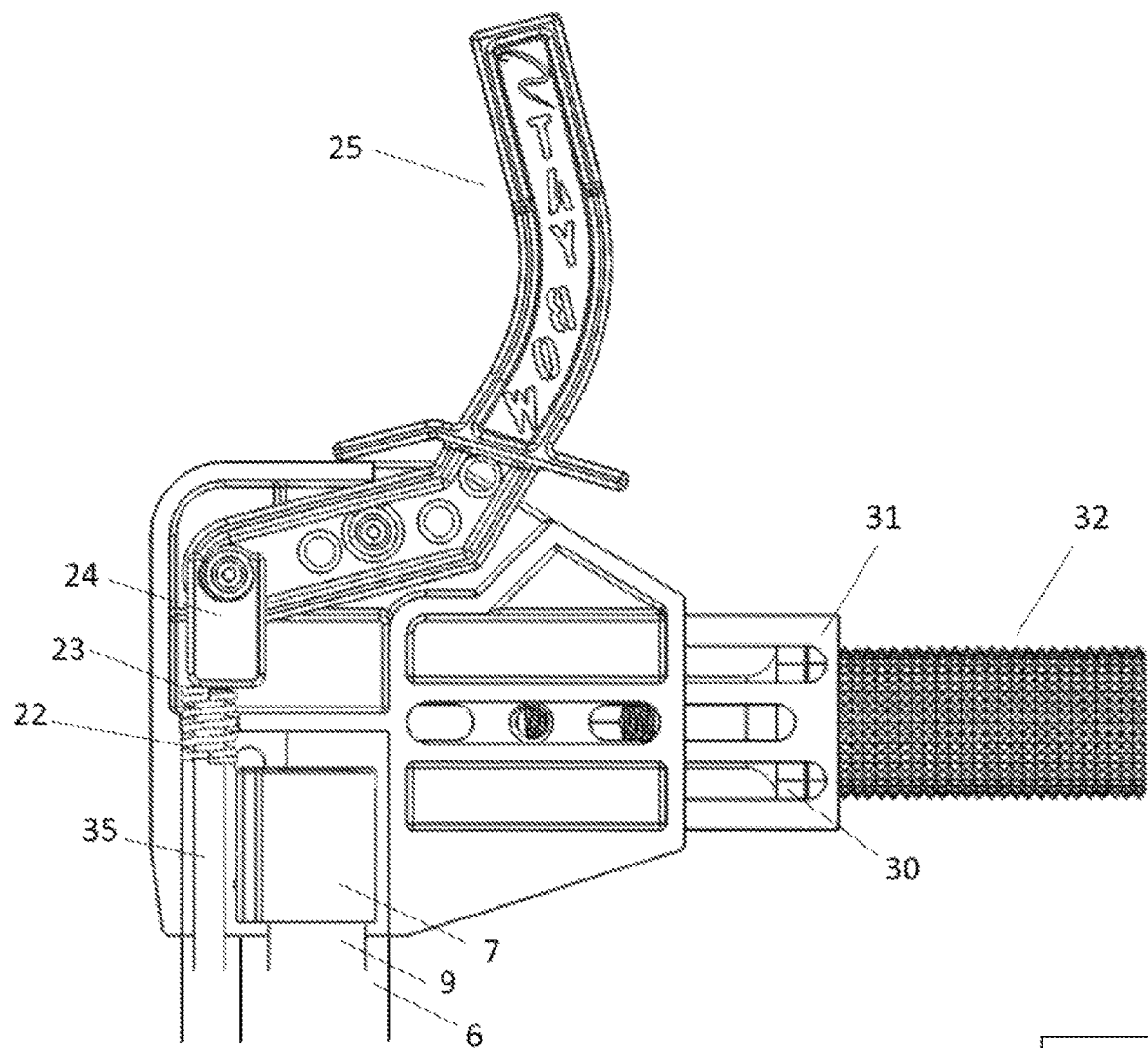
FIG. 3c illustrates a side cut-away view of the upper assembly of the support stand of FIG. 2.

As shown in FIG. 3a, the upper housing sub-assembly also includes a mechanism for telescoping adjustment of the support stand. In the illustrated embodiment the mechanism includes a trigger 25, a clevis 24, two snap rings 23 and a spring 22, which are configured to remotely control a locking mechanism residing in the lower assembly. FIG. 3c illustrates a detailed side cut-away view of the upper assembly. The lower portion of the trigger 25 is covered by the upper housing after assembly. The trigger 25 contains two sets of bosses. One set act as pivot points for the trigger when the trigger 25 is mounted in the recesses of upper housing. The other set acts as pivot points for the clevis 24, which translates the pivoting movement of trigger 25 into vertically linear movement. A locking rod 35 is connected to the clevis 24 by snapping into the clevis 24 and being secured linearly by the two snap rings 23. The clevis 24 contains an elongated slot, which prevents the locking rod 35 from inducing side load from the arcing motion of the trigger 25, to guarantee the purely linear motion of the locking rod 35 when the trigger 25 is actuated. A spring 22 is positioned under the clevis 24, with the locking rod 35 extending therethrough, to apply an upward bisecting force on the trigger 25, so when the user releases the trigger 25, the locking mechanism engages. An anti-rotation cap 7 is placed on the upper end of the inner frame member 9 to prevent rotational movement of the outer frame member of the leg assembly from the inner frame member.

Alternatively, instead of using a clevis 24 for the trigger 25, a trigger block, which may be a piece of metal threaded through the lower end of the trigger, can be used to translate the pivoting movement of the trigger 25 into the vertically linear movement of the locking rod 35.

Figure 3D:
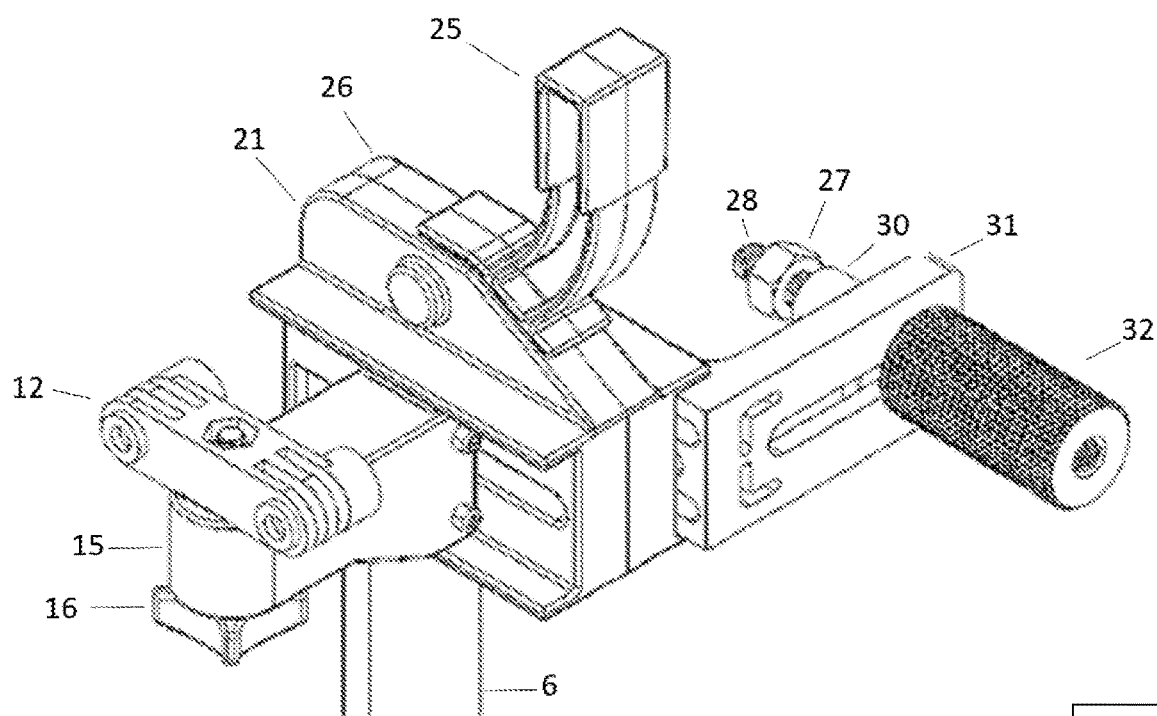
FIG. 3d illustrates another perspective view of the upper assembly of the support stand of FIG. 2.

FIG. 3d illustrates a perspective view of the complete upper assembly including the mounting sub-assembly, the upper housing sub-assembly and the accessory sub-assembly.

Figure 4:
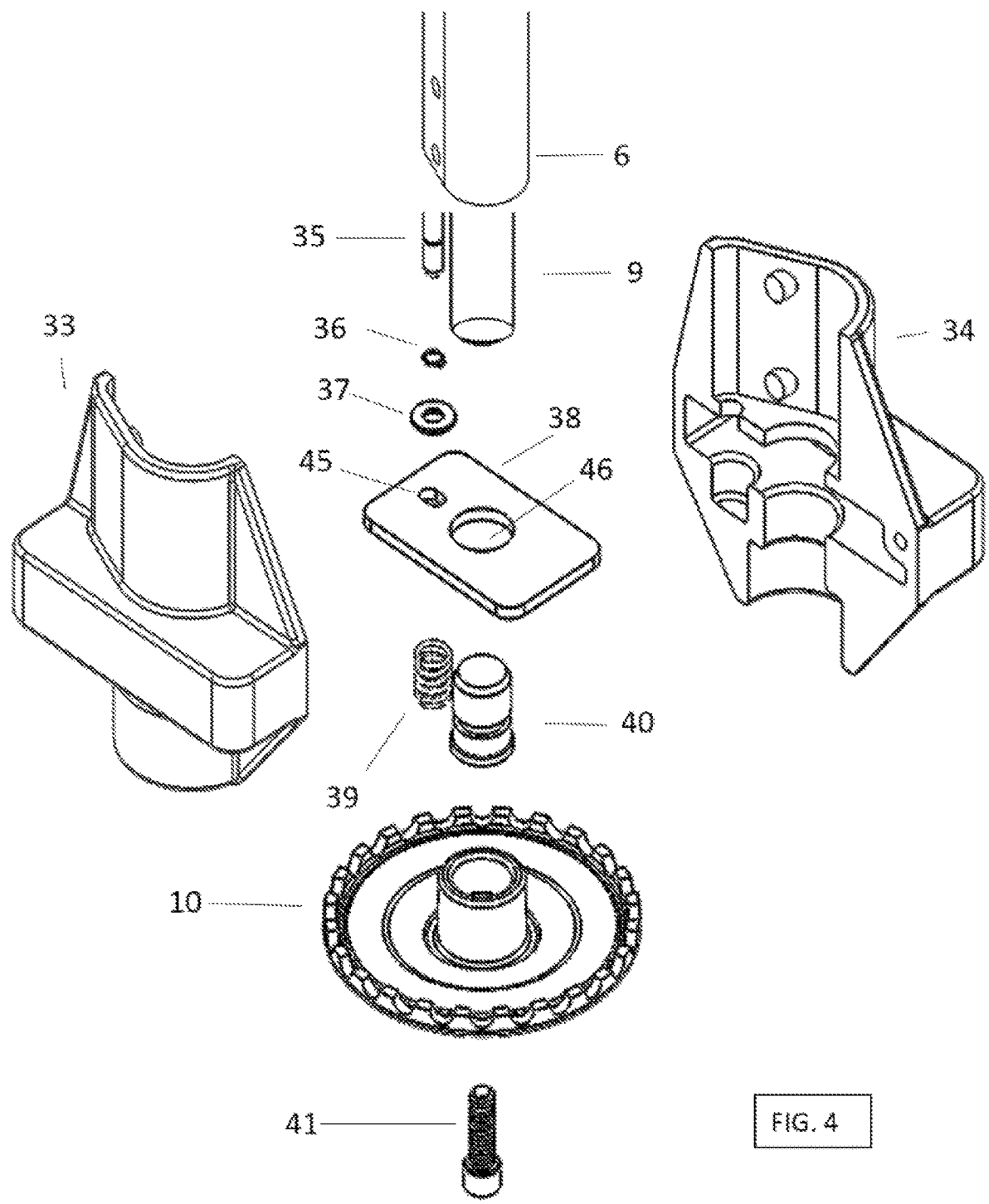
FIG. 4 illustrates an exploded view of the locking arrangement disposed in the lower assembly and the foot assembly.

FIG. 4 illustrates an exploded view of the housing in the lower assembly which contains the locking mechanism that controls the telescopically vertical movement of the outer inner member 9 with respect to the outer frame member 6. As shown in FIG. 4, the leg assembly includes an outer frame member 6 and an inner frame member 9. Parallel to the inner frame 9 is the locking rod 35. The inside of the outer frame member 6 is so contoured that the locking rod 35 and the inner frame member 9 may fully reside in the outer frame member 6 when the support stand 4 is fully retracted. The lower assembly housing includes two pieces, the lower housing-right 33 and the lower-housing-left 34. The outer frame member 6 has two recesses on both the upper end and the lower end, which will be retained by the built-in bosses of the upper housing and the lower housing when it is assembled, respectively.

FIG. 4 illustrates an exploded view of the lock mechanism and the foot assembly. The exemplary locking mechanism includes, from the top to the bottom, a snap ring 36, a washer 37, a locking plate 38, and a spring 39. The snap ring 36 is secured on the locking rod 35. The locking plate 38 contains two holes or other such cutouts 45, 46 in this embodiment of the instant disclosure, which receive the locking rod 35 and the inner frame member 9 therethrough. In the illustrated embodiment, the two cutouts 45, 46 are circular in shape. Alternatively, the locking plate 38 may have only one cutout to allow the inner frame member 9 to extend therethrough, while the locking rod 35 is attached directly to the locking plate 38.

Also shown in FIG. 4 is a foot assembly. The foot assembly includes a leg plug 40 which is configured to snuggly insert into the bottom opening of the inner frame member 9. The leg plug 40 is configured to allow various styles of foot to be attached to the support stand. Such configuration of the leg plug 40 includes, but not limited to, a threaded hole that allows a standard sized threaded bolt 41 thread in. The foot 10 may include a hole at the center to allow the threaded portion of the bolt 41 to pass through. The foot may be relatively flat to stabilize the support stand. More preferably, there are tooth-like upward protrusions at the rim of the foot to provide added grip when the user engages the foot assembly using their footwear for added stability. The foot can be in any shape. Alternatively, the foot assembly can include a dual-pod, tri-pod, or quad-pod legs.

Figure 5:
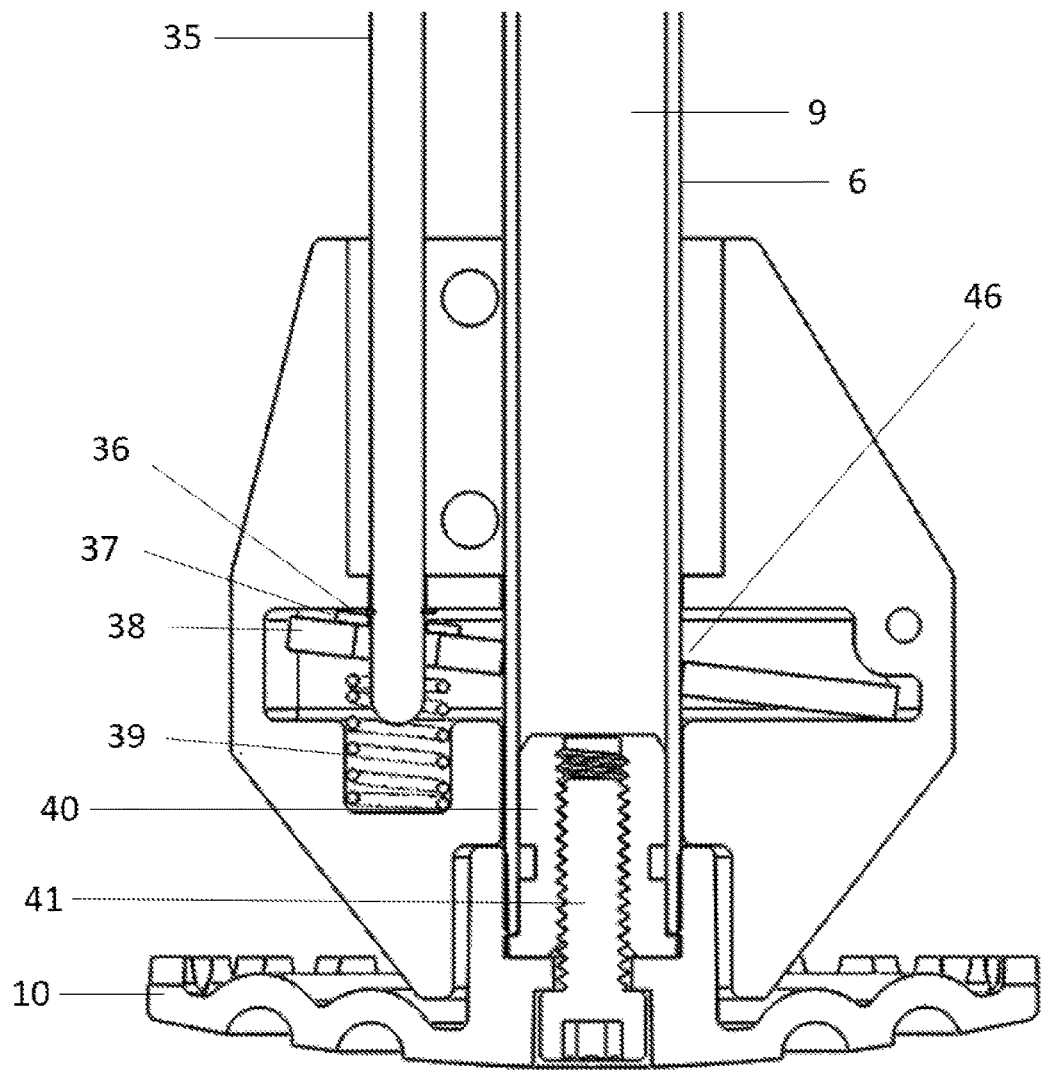
FIG. 5 illustrates a side cut-away view of the lower assembly and the foot assembly.

FIG. 5 illustrates a side cut-away view of the lower assembly and the foot assembly of the exemplary embodiment. A locking mechanism resides in the lower assembly. In the locking state, the spring 39 biases the locking plate 38 upward to a certain angle so that the edges of the cutout 46 in the locking plate 38 engage the inner frame member 9 to axially secure the inner frame member within the outer frame member 6. The washer 37 is used to control the degree of the angle of the locking plate, therefore control the locking strength. When a user depresses the trigger 25 in the upper assembly, the locking rod 35 is pressed down, forcing the locking plate 38 to pivot downward to allow the locking plate 38 to be substantially perpendicular to the inner frame member 9 disengaging the edges of the cutout 46 in the locking plate 38 from the inner frame member 9. The inner frame member 9 can then move vertically (e.g., by gravity or a user pulling force) to adjust the height of the support stand and the coupled compound bow. When the trigger 25 is released, the spring 39 pivots the locking plate 38 back to the locking state to secure the inner frame member 9 in the selected position.

Figure 6:
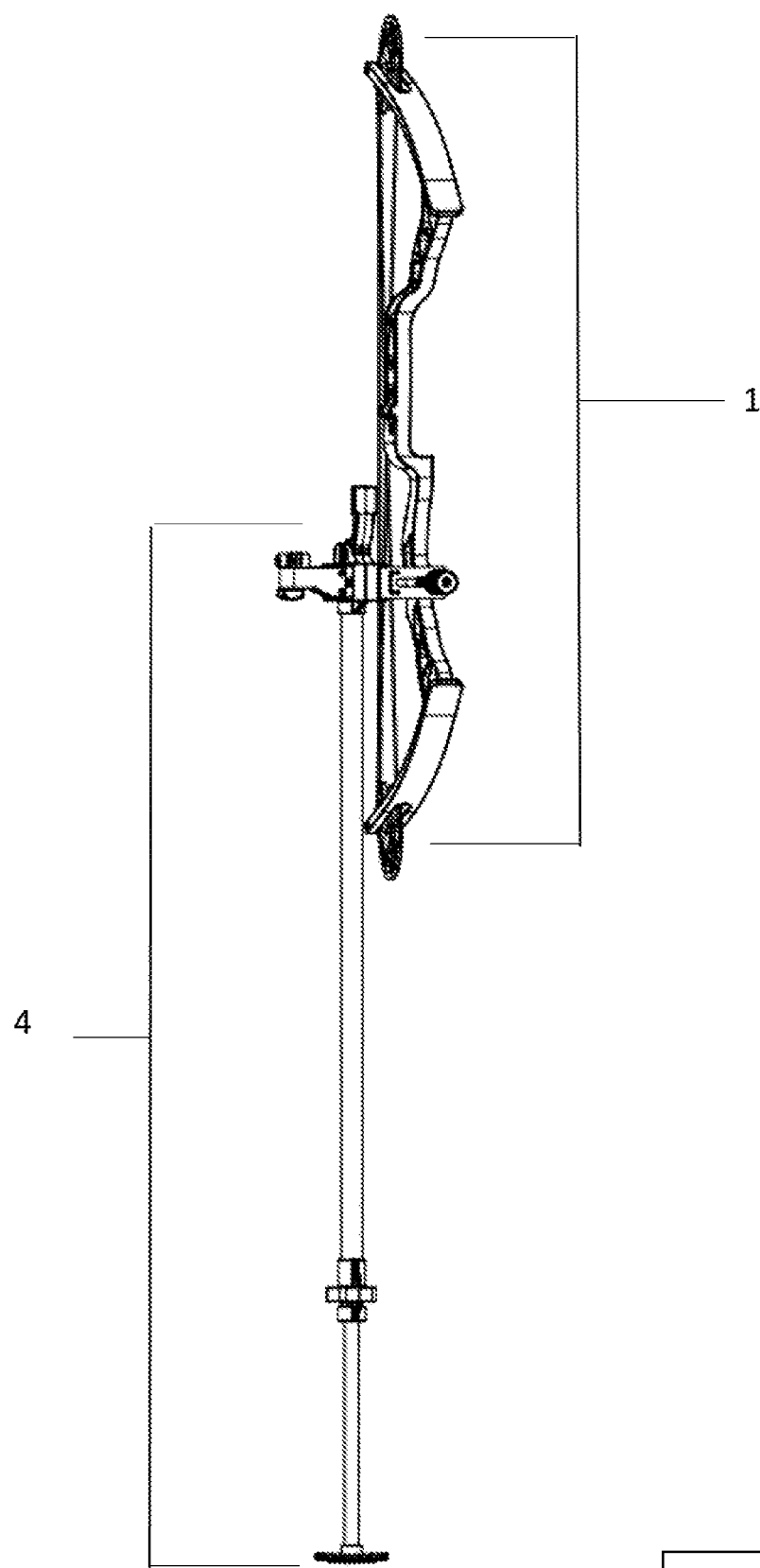
FIG. 6 illustrates a compound bow coupled to a support stand of FIG. 2, with the leg assembly being partially telescoped.

FIG. 6 illustrates a compound bow system, including a compound bow coupled to a partially telescoped support stand in an exemplary embodiment of the instant disclosure.

Furthermore, the instant disclosure also provides a method of utilizing the support stand in the exemplary embodiment. An exemplary method includes the following steps: Attaching the anti-rotation lock to the compound bow by screwing it into the stabilizer receiver; ensuring adjustable bracket is mounted on the correct side of the upper housing for either a left or right handed user; sliding the adjustment bracket over the anti-rotation lock and secure it with the stabilizer bolt; holding the support stand parallel to the vertical axis of the compound bow and tighten jam nut against the stabilizer receiver; gauging finger placement and bow alignment to the support stand trigger and altering the fore and aft and side to side movements to accommodate a user's hand size; depressing the trigger to allow the adjustment of the stand's height until a desired height is achieved; and releasing the trigger to lock the vertical adjustment in place at the desired height.

One with reasonable skill in the art understands that all of the above exemplary embodiments of the instant disclosure can be manufactured from multiple different materials and that all material known in the art suitable for producing all embodiments herein as described above, both in the detailed description of the instant disclosure and in the figures is contemplated and taught herein. In accordance with the various exemplary embodiments of the instant disclosure, all the parts disclosed herein may be produced from, but not limited to, plastic, metal, fiberglass, carbon/graphite, nylon, and/or ceramic material.

Moreover, unless specifically noted, it is the Applicants' intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

As used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known to those of reasonable skill in the art. Other combinations and/or modifications of structures, arrangements, applications, proportions, elements, materials, or components used in the practice of the instant disclosure, in addition to those not specifically recited, can be varied or otherwise particularly adapted to specific environments, manufacturing specifications, design parameters or other operating requirements without departing from the scope of the instant disclosure and are intended to be included in this disclosure.

What is claimed is:

1. A telescoping support stand comprising:
   a foot assembly for engaging a ground surface;
   a telescoping leg comprising an inner frame member having a lower end attached to the foot assembly, and an outer frame member including a first passage telescopically receiving an upper end of the inner frame member;
   a leg locking arrangement comprising:
      a lower housing secured to a lower end of the outer frame member and defining a passage for receiving the upper end of the inner frame member;
      a locking plate disposed in the lower housing, the locking plate being movable between a locking position in which the locking plate is biased to engage the inner frame member and secure the inner frame member with respect to the outer frame member, and a releasing position in which the locking plate disengages from the inner frame member to permit telescoping movement of the inner frame member with respect to the outer frame member; and
      a biasing member disposed in the lower housing and configured to bias the locking plate toward the locking position; and
   a lock releasing arrangement comprising:
      an upper housing secured to an upper end of the outer frame member;
      an actuating rod extending through a second passage in the outer frame member and including a first end received in the upper housing and a second end received in the lower housing engageable with the locking plate, the actuating rod being able to move the locking plate from the locking position to the releasing position; and a user operable actuator assembled with the upper housing and operable to move the actuating rod.

2. The support stand of claim 1, wherein the locking plate is pivotable.

3. The support stand of claim 1, wherein the inner frame member extends through a cutout in the locking plate, wherein when the locking plate is in the locking position, an edge portion of the cutout engages the inner frame member to secure the inner frame member with respect to the outer frame member.

4. The support stand of claim 3, wherein the locking plate is substantially perpendicular with respect to the inner frame member when the locking plate is in the releasing position, such that the edge portion of the cutout is disengaged from the inner frame member.

5. The support stand of claim 1, wherein the user operable actuator is pivotable.

6. The support stand of claim 1, wherein the actuating rod slides down to actuate locking plate.

7. The support stand of claim 1, wherein the telescoping leg and foot assembly extend under gravity after the locking plate is moved to the releasing position.

8. The support stand of claim 1, further comprising at least one mounting arrangement assembled with the upper housing, the mounting arrangement comprising:
a mounting bracket having a front arm and side arm;
the front arm allowing lateral adjustments to couple with various sized operable devices;
the side arm being movable with regard to the upper housing along the forward and aft direction to accommodate to a user's hand size;
a securing mechanism to secure the front arm of the bracket to the user-operated device; and
a securing mechanism to secure the side arm of the bracket to the upper housing.

9. The support stand of claim 8, wherein the mounting arrangement is configured to attach to either side of the upper assembly.

10. A telescoping support stand having a foot assembly adapted to contact a ground surface, a telescoping leg assembly, an upper housing, and a mounting arrangement attached to the upper housing, the mounting arrangement comprising:
an adjustment bracket having means for coupling to a user operated device on a front arm of the adjustment bracket and coupling to the upper housing of the telescoping support stand on a side arm of the adjustment bracket;
a primary securing mechanism to secure the front arm of the mounting bracket to the user operated device;
a secondary securing mechanism to secure the side arm of the mounting bracket to a face of the upper housing;
the bracket having means for lateral adjustment on the front arm with regard to the telescoping support stand to allow coupling to various-sized operable devices; and
the bracket having means for forward or aft adjustment on the side arm with regard to the upper housing to accommodate a user's hand size and allow adequate clearance for the user's hand between the adjustment bracket and the user operated device.

11. The support stand of claim 10, wherein the front arm of the adjustment bracket has a linear pocket set to receive an anti-rotation lock, the anti-rotation lock preventing the telescoping support stand from changing orientation in relation to the user-operated device.

12. The support stand of claim 10, wherein the mounting arrangement is configured to secure to either face of the upper housing.

13. The support stand of claim 11, wherein the mounting arrangement is configured to secure to either face of the upper housing.

14. A telescoping support stand having a foot assembly adapted to contact a ground surface, a telescoping leg assembly, an upper housing, and a mounting arrangement attached to the upper housing, the mounting arrangement comprising:
an adjustment bracket having means for coupling to a user operated device on a front arm of the adjustment bracket and coupling to the upper housing of the telescoping support stand on a side arm of the adjustment bracket;
a primary securing mechanism to secure the front arm of the mounting bracket to the user operated device;
a secondary securing mechanism to secure the side arm of the mounting bracket to a face of the upper housing;
the bracket having means for lateral adjustment on the front arm with regard to the telescoping support stand to allow coupling to various-sized operable devices; and
the bracket having means for forward or aft adjustment on the side arm with regard to the upper housing to accommodate a user's hand size and allow adequate clearance for the user's hand between the adjustment bracket and the user operated device,
wherein the mounting arrangement additionally includes an accessory assembly, the accessory assembly comprising:
an accessory mount to facilitate attachment of accessories to the upper housing secured to the opposite face of the mounting assembly;
a tertiary securing mechanism to secure the accessory mount of the accessory assembly to a face of the upper housing;
the accessory mount having means for forward or aft adjustment with regard to the upper housing;
the accessory mount being configured to receive an accessory holder; and
the accessory holder being disposed to accept an accessory.

15. The support stand of claim 14, wherein the accessory assembly is configured to attach to either face of the upper housing.

* * * * *